United States Patent [19]

Liggett

[11] 4,318,451

[45] Mar. 9, 1982

[54] DUAL FUNCTION REMOTE STEERING CONTROL

[75] Inventor: Richard K. Liggett, Dennison, Ohio

[73] Assignee: The Warner & Swasey Company, Cleveland, Ohio

[21] Appl. No.: 153,400

[22] Filed: May 27, 1980

[51] Int. Cl.³ .............................................. B62D 5/08
[52] U.S. Cl. .................................. 180/324; 180/132; 180/321; 180/327
[58] Field of Search ............... 180/321, 324, 327, 6.58, 180/6.6, 132, 140

[56] References Cited

U.S. PATENT DOCUMENTS

| | | | |
|---|---|---|---|
| 2,728,463 | 12/1955 | Beckwith | 180/324 |
| 2,959,260 | 11/1960 | Johnson et al. | 180/324 |
| 3,587,886 | 6/1971 | Gano et al. | 414/718 |
| 3,599,814 | 8/1971 | Brownfield | 180/324 |
| 3,666,125 | 5/1972 | Gano et al. | |
| 3,935,918 | 2/1976 | Hick et al. | 180/133 |
| 3,990,527 | 11/1976 | Inui et al. | 180/6.58 |
| 4,016,948 | 4/1977 | Kuester | 180/132 |
| 4,140,199 | 2/1979 | Lester | 180/327 |
| 4,177,869 | 12/1979 | Crabiel | 180/6.58 |
| 4,199,038 | 4/1980 | Rathje et al. | 180/140 |

FOREIGN PATENT DOCUMENTS

| | | |
|---|---|---|
| 1081327 | 11/1960 | Fed. Rep. of Germany . |
| 2232204 | 12/1974 | France . |
| 111663 | 3/1975 | German Democratic Rep. . |
| 111664 | 3/1975 | German Democratic Rep. . |
| 1369081 | 10/1974 | United Kingdom . |

Primary Examiner—Joseph F. Peters, Jr.
Assistant Examiner—Donn McGiehan
Attorney, Agent, or Firm—Howard G. Massung

[57] ABSTRACT

A dual steering system for use on a material handling vehicle having a chassis with front steerable wheels and an upperstructure movably supported from the chassis for rotary movement about a connecting center pin. The vehicle has a main truck cab on the chassis, from which the vehicle may be driven over road to a selected site, and an operator cab on the upperstructure from which the excavator vehicle may be operated and also driven for short distances. When the vehicle is driven over road, the vehicle is steered from a steering wheel in the main truck cab, and hydraulic power is provided by a hydraulic power supply mounted on the chassis. When the excavator is controlled from the operator cab, the vehicle is steered with a joy stick and hydraulic power is supplied from an alternate hydraulic supply on the upperstructure. Thus, two alternate but interconnected sources of hydraulic fluid are utilized to provide power to a hydraulically powered, mechanically controlled steering gear. Operatively connected to the mechanical input of the chassis steering gear is the output of a tee gear box which has two rotary mechanical inputs for controlling the output. One rotary input to the tee gear box is from the steering wheel located in the main truck cab on the chassis. A second rotary input to the tee gear box is provided by a hydraulic torque motor which is controlled through the joy stick steering device in the operator cab on the upperstructure.

9 Claims, 2 Drawing Figures

DUAL FUNCTION REMOTE STEERING CONTROL

BACKGROUND OF THE INVENTION

1. Field of the Invention

This invention relates to steering of a vehicle and more particularly to a dual steering system for a material handling vehicle.

2. Description of the Prior Art

Frequently, a heavy duty material handling mechanism, such as a crane or excavator, is mounted from an upperstructure supported by a truck chassis. The truck is capable of being driven over the road or highway under the control of an operator in the main truck cab. The material handling mechanism is supported on the upperstructure which is mounted by a center pin for relative movement with respect to the truck chassis. An operator's cab is provided on the upperstructure to move with the material handling mechanism. During operation at a construction site, an operator in the operator cab can control movement of the truck. U.S. Pat No. 3,599,814 teaches a remote drive mechanism for powering the drive wheels from an auxiliary engine mounted on the upperstructure.

In a prior art machine steering from the truck cab is accomplished through a steering wheel which provides the mechanical input to the steering gearbox. Hydraulic power is provided to the steering gearbox from a power steering pump which is driven by the truck engine. The steering wheel provides mechanical control of the hydraulic power applied to the steering gearbox. The mechanical output of the steering gearbox, through a relay arm, is linked to a steering arm which is connected to the front wheels. Steering from the operator's cab, located on the upperstructure, is accomplished through a steering lever which is mechanically linked to a steering valve. The steering valve receives hydraulic power from a power steering pump located on the upperstructure power unit. The hydraulic output from the steering valve is routed through a center pin to a steering cylinder located on the truck chassis. The steering cylinder can be extended or retracted in response to the output of the steering valve. The output of the steering cylinder is connected to the relay arm which is connected to the steering arm for positioning the front wheels. Steering from the operator's cab can override steering from the truck cab. In this prior art machine the steering system from the truck cab and the steering system from the operator's cab are hydraulically and mechanically independent before the relay arm.

SUMMARY OF THE INVENTION

The present invention teaches an improved dual function steering system for use on a material handling vehicle. The disclosed dual steering mechanism provides an all hydraulic system with an interconnected hydraulic system having a first hydraulic power supply mounted on the upperstructure and a second hydraulic power supply mounted on the chassis. The disclosed dual steering system utilizes one hydraulically powered mechanically controlled steering gear box which can be sumultaneously or independently powered from the two hydraulic power supplies.

The disclosed dual function remote steering system utilizes a first hydraulic power supply mounted on the upperstructure which provides hydraulic power and hydraulic control for steering the vehicle from the operator cab on the upperstructure, and a second hydraulic power supply supported on the truck chassis which normally provides hydraulic power for steering the vehicle from the main truck cab. The reservoirs for the upperstructure hydraulic power supply and the chassis power supply are interconnected to provide for a common oil supply. The output of the upper hydraulic power supply goes through a flow divider which divides the hydraulic flow into two components, one of which provides power for operating the chassis steering gear and the other of which provides hydraulic control power through which the vehicle is steered from the operator cab. A steering valve is provided which is responsive to a steering device in the operator cab to provide hydraulic fluid through the center pin to a torque motor mounted on the main chassis.

The torque motor provides one input to a two input tee gear box, the output of which is connected to the chassis steering gear. The tee gear box has another input connected to the steering wheel in the main truck cab. Thus, when the upper power supply is energized, the vehicle can be steered either through the steering wheel in the main cab or the steering device in the operator cab.

It is an object of the invention to teach a dual location steering control system which is all hydraulic controlled and utilizes two independent hydraulic supplies which are connected in a common hydraulic system.

BRIEF DESCRIPTION OF THE DRAWINGS

For a better understanding of the invention, reference may be had to the preferred embodiment exemplary of the invention, shown in the accompanying drawings in which.

DESCRIPTION OF THE PREFERRED EMBODIMENT

Figure 1:
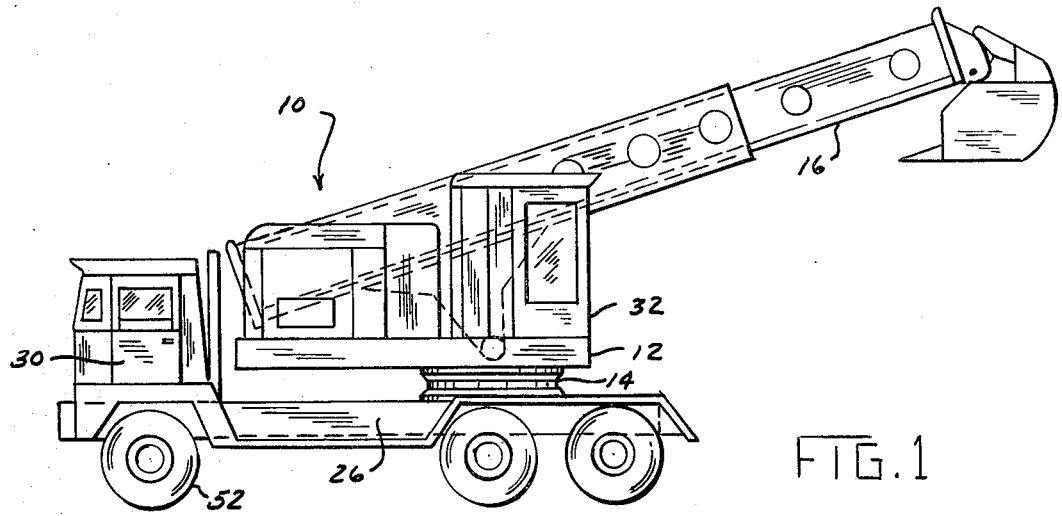
FIG. 1 is a side view of a truck mounted extendable boom hydraulic excavator for which the disclosed dual location steering system is particularly suitable; and, FIG. 2 is a schematic of dual function remote steering control system according to the teaching of the present invention.

Referring now to the drawings, there is shown in FIG. 1 an excavating vehicle 10 having a boom 16 formed with a pair of telescoping sections. Boom 16 is pivotally mounted on an upperstructure 12 which is rotatably supported by a center pin 14 from the main truck chassis 26. Vehicle 10 is provided with a forward or main truck cab 30 and a rearward or upperstructure operator cab 32. Truck cab 30 is occupied by an operator during over the road movement to a selected site. Operator cab 32 is occupied by the operator during operation of the boom assembly which is mounted on upper support platform 12. The general construction of the material handling vehicle 10 is similar to that disclosed in U.S. Pat. Nos. 3,587,886; 3,599,814; and 3,666,125 from which a more detailed description of this type vehicle may be obtained.

Figure 2:
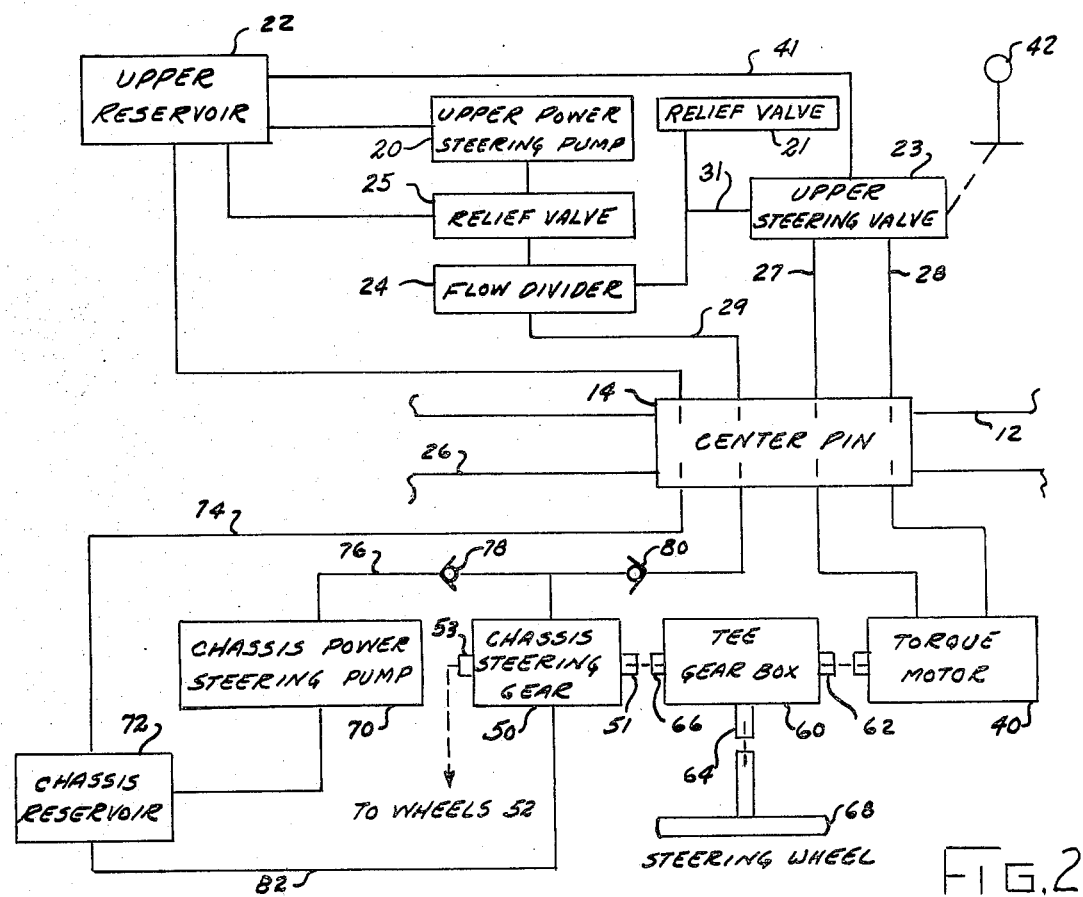

Referring now to FIG. 2, there is shown a schematic of a dual steering assembly constructed according to the teaching of the present invention. Center pin 14 rotatably supports upperstructure 12 from chassis 26. An upper power steering pump 20, connected to an upper reservoir 22, provides pressurized hydraulic fluid. Reservoir 22, power pump 20, and the associated drive (not shown) form the upperstructure hydraulic power supply. The pressurized hydraulic output of power steering pump 20 is connected to pressure relief valve 25. Pressure relief valve 25 is set to limit hydraulic pressure to 2,000 p.s.i. The pressure regulated hydraulic fluid is fed to flow divider 24.

Flow divider 24 divides the pressurized hydraulic fluid from power steering pump 20 into two components. The first component from flow divider 24 is fed through the center pin 14 via connection 29 and provides the hydraulic power for steering vehicle 10 when controlled from operator cab 32. The other output of flow divider 24 is fed to upper steering valve 23 via connection 31.

Upper steering valve 23 has hydraulic connections 27 and 28 which extend through center pin 14 to a torque motor 40. Steering valve 23, which can be the type as manufactured by Sheller Globe Co., Model No. 79-218, is operable in response to the joy stick steering device 42 mounted in operator cab 32. A return line 41 connects the output of steering valve 23 to the upper reservoir 22. Torque motor 40 can rotate in either direction depending on the flow direction of the pressurized hydraulic fluid through the appropriate supply line 27 or 28 in response to positioning of steering device 42 by an operator in cab 32. The upperstructure steering valve 23 has associated therewith a relief valve 21 which is set to provide relief at approximately 1000 p.s.i. to limit the pressure of the control fluid in lines 27 and 28. Center pin 14 is a structure well known in the art which allows a rotatable upper member 12 to have several fluid communicating passages with a relatively stationary lower member. The pressurized hydraulic output from the flow divider 24 is fed through line connection 29 which extends through center pin 14.

A hydraulically operated mechanically controlled steering gear assembly 50, as manufactured by Ross Co., Model No. HFB-64, is utilized for steering wheels 52 of vehicle 10. Steering gear assembly 50 is mounted on chassis 26. Steering gear assembly 50 has a mechanical output 53 connected through appropriate mechanical linkages to wheels 52 to turn them in response to a mechanical input applied to input 51. Pressurized hydraulic fluid for operating steering gear assembly 50 can be supplied from the upperstructure power supply through connection 29. A tee gear box 60, as manufactured by Curtis Machine Co., Model No. 914,200, is provided which has a first mechanical input 62 and a second mechanical input 64 for controlling a mechanical output 66. Output 66 of the tee gear box 60 is connected to the input 51 of chassis steering assembly 50. The mechanical output of torque motor 40 is connected to the input 62 of tee gear box 60 for steering vehicle 10 in response to positioning of steering device 42 located in operator cab 32. The other input 64 to tee gear box 60 is connected to steering wheel 68 which is positioned in truck cab 30.

A chassis power steering pump 70 is provided on chassis 26. Associated with chassis power steering pump 70 is reservoir 72 which is also supported on chassis 26. Chassis reservoir 72, power steering pump 70 and the associated truck drive (not shown) form the chassis hydraulic supply. Upper reservoir 22 and chassis reservoir 72 are connected in fluid communication by connection 74 which extends through center pin 14 to provide for a common hydraulic system. The pressurized hydraulic output of chassis steering pump 70 is connected through a suitable connection 76 to chassis steering assembly 50. Check valves 78 and 80 are provided in the connections of the chassis hydraulic power supply and the upperstructure hydraulic power supply, respectively, to steering gear assembly 50. Check valves 78 and 80 restrict the flow direction of the pressurized hydraulic fluid from upperstructure power steering pump 20 and chassis power steering pump 70 to the desired path through chassis steering gear 50. The output of chassis steering gear assembly 50 is conducted through a suitable connection 82 to the chassis reservoir 72.

The disclosed dual steering control provides for an all hydraulic system utilizing one steering gear box assembly 50 which can simultaneously or individually be powered from two independent sources of hydraulic power 20 and 70. Since reservoirs 22 and 72 are interconnected, an independent check on the oil level of the chassis power supply is not required. Both the truck engine, which drives chassis power steering pump 70, and an upperstructure engine, which drives upperstructure power steering pump 20, can be running simultaneously without damage to the steering systems. The chassis power steering pump 70 will not easily run out of oil, even if a leak occurs in the chassis hydraulic system, since it can draw from the upper reservoir 22. If the chassis power steering pump 70 should fail, the pressurized hydraulic fluid for operating chassis steering assembly 50 can be obtained by running the upperstructure engine for the upperstructure power steering pump 20. The remote drive from operator cab 32 is through the chassis steering assembly 50 and does not override it.

I claim:
1. A material handling vehicle comprising:
   a power driven chassis having a main cab;
   front wheels on said chassis which are positionable to steer said driven chassis;
   an upperstructure supported by said chassis and being movable relative thereto having an operator cab;
   a center pin connecting said chassis and said upperstructure;
   an upper hydraulic power supply disposed on said upperstructure providing an output of pressurized hydraulic fluid;
   a flow divider connected to the output of said upper hydraulic power supply to divide the output thereof into a control component output and a power component output;
   chassis steering means having a mechanical output, connected to said front wheels for steering said chassis, and a hydraulic input, which receives pressurized hydraulic fluid, and a mechanical input which controls the mechanical output for steering said chassis;
   a chassis power supply disposed on said chassis providing a second source of pressurized hydraulic fluid;
   first connecting means for connecting the power component output of said flow divider through said center pin to the hydraulic input of said chassis steering means;
   second connecting means for connecting the hydraulic output of said chassis power supply to the hydraulic input of said chassis steering means;
   a tee gear box having a mechanical output, connected to the mechanical input of said chassis steering mechanism, and first and second mechanical inputs;

a torque motor disposed on said chassis having a mechanical output connected to the first mechanical input of said tee gear box;

a positionable steering device located in the operator cab on said upperstructure;

a steering valve operably connected to said steering device having a hydraulic connection to the control component output of said flow divider and providing an output in response to positioning of said steering device;

third connecting means connecting the output of said steering valve through said center pin to said torque motor for positioning the torque motor in response to positioning of said steering device on said upperstructure; and, a steering wheel in the main cab on said chassis connected to the second mechanical input of said tee gear box.

2. A vehicle as claimed in claim 1 comprising:

a first check valve disposed in said first connecting means to direct hydraulic flow from said flow divider to said chassiss steering means; and a second check valve disposed in said second connecting means to direct hydraulic flow from said chassis power supply to said chassis steering means.

3. A vehicle as claimed in claim 2 comprising:

a first pressure relief valve disposed in the output of said upper hydraulic power supply and a second pressure relief valve, set at a lower value than said first pressure relief valve, disposed in the control component output of said flow divider.

4. An excavating vehicle comprising:

a main chassis which is driven and steerable;

a hydraulic powered mechanically controlled steering means for steering said main chassis;

a tee gear box having two mechanical inputs and a mechanical output, which is responsive to positioning of either mechanical input, connected to said steering means;

a chassis steering device, disposed on said main chassis, connected to one mechanical input of said tee gear box;

a hydraulic torque motor disposed on said main chassis, connected to the second mechanical input of said tee gear box;

an upperstructure supported from said main chassis and being rotatable about a center pin connection thereto;

an upperstructure steering device, supported on said upperstructure, having a hydraulic output connected through said center pin to said hydraulic torque motor for positioning said hydraulic torque motor;

a main chassis hydraulic power supply supported on said main chassis and having a pressurized hydraulic fluid output connected to said steering means;

an upperstructure hydraulic power supply supported on said upperstructure and having a pressurized hydraulic fluid output connected through said center pin to said steering means; and, said upperstructure power supply and said chassis hydraulic power supply having an innerconnected common reservoir.

5. An excavating vehicle as claimed in claim 4 comprising:

a flow divider, connected to the output of said upperstructure hydraulic power supply, having two outputs, one of which is the output connected through said center pin to said steering means, and the other is connected to said upperstructure steering device; and, a pressure relief valve, connected to the output of said upperstructure hydraulic power supply before said flow divider, to limit the pressure of the pressurized hydraulic fluid supplied to said flow divider.

6. An excavating vehicle as claimed in claim 5 comprising:

a first check valve disposed between said main chassis hydraulic power supply and said steering means to limit hydraulic flow to a direction toward said steering means; and, a second check valve disposed between said upperstructure hydraulic power supply and said steering means to limit hydraulic flow to a direction toward said steering means.

7. In a dual control system for a vehicle having a first station, mounted on a chassis, for controlling steering of the vehicle with a steering wheel, and a second station, mounted on an upperstructure which is rotatably supported from the chassis, for steering the vehicle with a steering device wherein control inputs for steering the vehicle from the first station and the second station are provided to a common steering gear box, the improvement comprising:

an upperstructure hydraulic reservoir mounted on the upperstructure;

an upperstructure power steering pump having an input connected to said upper reservoir and an output for providing pressurized hydraulic fluid;

a chassis hydraulic reservoir supported on said chassis;

a chassis power steering pump having an input connected to said chassis reservoir and an output for providing pressurized hydraulic fluid to the common steering gear box;

a hydraulic connection between said upperstructure reservoir and said chassis reservoir to provide free communication therebetween;

a flow divider, disposed in the output of said upperstructure power steering pump, having a first output connection for supplying pressurized hydraulic fluid to the common steering gear box and a second pressurized hydraulic fluid output;

steering valve means connected to said second output of said flow divider to provide steering control to the common steering gear box from the second station.

8. A dual control system for a vehicle as claimed in claim 7 comprising:

a tee gear box having two mechanical inputs and a mechanical output connected to said common steering gear box;

the steering wheel in the first station connected to one input of said tee gear box;

a torque motor responsive to hydraulic output from said steering valve, connected to the other input of said tee gear box.

9. In a material handling vehicle steerable from a truck cab fixed to the vehicle chassis and also steerable from an operator cab fixed to an upperstructure which is rotatably connected to the vehicle chassis through a center pin the improvement comprising:

an upperstructure hydraulic reservoir disposed on the upperstructure;

a chassis hydraulic reservoir disposed on the vehicle chassis;

connecting means innerconnecting said upperstructure hydraulic reservoir and said chassis hydraulic reservoir through the center pin to provide free communication therebetween;

a chassis power steering pump, supported on the chassis and connected to said chassis hydraulic reservoir, providing hydraulic power for steering controlled from the truck cab;

an upperstructure power steering pump, supported on the upperstructure and connected to said upperstructure hydraulic reservoir, providing hydraulic power for steering controlled from the truck cab or the operator cab; and a flow divider in the output from said upperstructure power steering pump dividing the output into a power component output and a control component output;

the power component output provides power for steering; and, the control component provides pressurized hydraulic fluid for control of steering from the operator cab.

* * * * *